United States Patent
Rusu et al.

(10) Patent No.: US 10,212,555 B1
(45) Date of Patent: Feb. 19, 2019

(54) ENABLING AND DISABLING LOCATION SHARING BASED ON ENVIRONMENTAL SIGNALS

(71) Applicant: Microsoft Technology Licensing, LLC, Redmond, WA (US)

(72) Inventors: Andi F. Rusu, Seattle, WA (US); Felix G. T. I. Andrew, Seattle, WA (US); Patrick Michael Halvorsen, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/703,738

(22) Filed: Sep. 13, 2017

(51) Int. Cl.
*H04W 4/02* (2018.01)
*H04W 4/029* (2018.01)
(Continued)

(52) U.S. Cl.
CPC ........ *H04W 4/029* (2018.02); *G06F 17/3087* (2013.01); *H04W 4/023* (2013.01); *H04L 67/16* (2013.01)

(58) Field of Classification Search
CPC ....... H04W 4/02; H04W 4/021; H04W 4/023; H04W 4/80; H04W 4/025; H04W 12/06; H04W 4/008; H04W 4/022; H04W 4/029; H04W 4/08; H04W 4/10; H04W 4/185; H04W 4/21; H04W 4/22; H04W 4/90; H04W 64/00; H04W 12/08; H04W 64/003; H04W 12/02; H04W 4/027; H04W 4/14; H04W 4/50; H04W 68/12; H04W 72/121; H04W 76/14; H04W 84/18; H04W 28/06; H04W 40/244; H04W 48/10; H04W 4/00; H04W 4/024; H04W 4/04; H04W 4/043; H04W 4/046; H04W 76/45; H04W 76/50; H04W 84/08; H04W 84/12; H04W 88/02; H04W 8/186; H04L 67/18; H04L 51/20; H04L 67/22; H04L 67/24; H04L 63/102; H04L 67/02; H04L 67/04; H04L 67/1046; H04L 67/306; H04L 67/42; H04L 12/1822; H04L 29/06; H04L 51/04; H04L 51/046; H04L 51/32; H04L 51/38; H04L 65/403; H04L 67/10; H04L 67/325;
(Continued)

(56) References Cited

U.S. PATENT DOCUMENTS 9,264,849 B1 * 2/2016 Kahn ................. G06Q 10/1095
9,538,332 B1 * 1/2017 Mendelson ............. H04W 4/90
(Continued)

*Primary Examiner* — Nathan S Taylor
(74) *Attorney, Agent, or Firm* — Holzer Patel Drennan

(57) ABSTRACT

Environmental signals are used to determine when to prompt a user to enable location sharing on their computer devices. These environmental signals may include the current location of the user being an unusual location for the user or a location that is tagged as a known social location such as a concert venue, stadium, or park. The environmental signals may also include one or more friends of the user being near the user. If the user chooses to enable location sharing in response to the prompt, the location of the user may be shared with some or all of their friends, or just the friends that have been determined to be near the user. After some amount of time has passed, or the environmental signals have changed, the location sharing may be automatically disabled for the user.

20 Claims, 8 Drawing Sheets

(51) Int. Cl.
*G06F 17/30* (2006.01)
*H04L 29/08* (2006.01)

(58) Field of Classification Search
CPC ...... G06F 17/3053; G06F 21/00; G06F 21/31; G06F 21/62; G06F 21/6218; G06F 21/6245; G06F 3/04842
USPC .................. 455/456.2, 445, 456.1, 515, 518; 370/254
See application file for complete search history.

(56) References Cited

U.S. PATENT DOCUMENTS

| | | | |
|---|---|---|---|
| 2003/0100326 A1* | 5/2003 | Grube | H04W 84/08 455/515 |
| 2005/0186965 A1* | 8/2005 | Pagonis | G01S 5/0072 455/456.1 |
| 2006/0223518 A1* | 10/2006 | Haney | H04W 4/21 455/420 |
| 2008/0070593 A1* | 3/2008 | Altman | H04W 4/029 455/457 |
| 2008/0209011 A1* | 8/2008 | Stremel | G06Q 20/20 709/219 |
| 2010/0144368 A1* | 6/2010 | Sullivan | H04W 4/02 455/456.2 |
| 2012/0008526 A1* | 1/2012 | Borghei | H04W 4/021 370/254 |
| 2015/0018011 A1* | 1/2015 | Mendelson | G01C 21/206 455/456.3 |
| 2016/0026821 A1* | 1/2016 | Meredith | G06F 21/00 726/1 |
| 2016/0234265 A1* | 8/2016 | Lohe | H04L 65/403 |
| 2016/0308798 A1* | 10/2016 | Magistrado | H04L 51/046 |

* cited by examiner

800

ENABLING AND DISABLING LOCATION SHARING BASED ON ENVIRONMENTAL SIGNALS

BACKGROUND

Modern computing devices such as smartphones and tablet computers allow users to share their locations with other users. A user who has enabled location sharing can view the current locations of their friends on a map, and vice versa. Some applications such as social networking applications can make use of location sharing by notifying users when they are near one or more of their friends or contacts.

As may be appreciated, enabling location sharing can facilitate in-person social interaction. For example, a user may be at a concert and not realize that one of their friends is at the same concert. However, if the user and their friend have enabled location sharing, one or more applications on their respective computing devices may alert the user that the friend is nearby, and the user may enjoy the concert with their friend.

While such location sharing is useful for a variety of applications, many users do not enable location sharing on their mobile devices. One reason may be that many users spend much of their time performing routine activities such as working, shopping for food, and watching television and either do not want others to know their locations while they perform these activities, or are not interested in others contacting them while they perform these activities. As a result, users may miss out on the benefits of location sharing during their leisure time.

SUMMARY

Environmental signals are used to determine when to prompt a user to enable location sharing on their computer devices. These environmental signals may include the current location of the user being an unusual location for the user or a location that is tagged as a known social location such as a concert venue, stadium, or park. The environmental signals may also include one or more friends of the user being near the user. If the user chooses to enable location sharing in response to the prompt, the location of the user may be shared with some or all of their friends, or just the friends that have been determined to be near the user. After some amount of time has passed, or the environmental signals have changed, the location sharing may be automatically disabled for the user.

In an implementation, a system recommending that location sharing be enabled for a user in response to determining that one or more trigger conditions are satisfied, and for disabling location sharing in response to determining that the one or more trigger conditions are no longer satisfied is provided. The system includes at least one computing device and a sharing engine. The sharing engine: determines a current location of a device associated with a user; determines a plurality of environmental signals; retrieves one or more trigger conditions; based on the determined current location of the device associated with the user and the determined plurality of environmental signals, determines that the one or more trigger conditions are satisfied; in response to the determination that the one or more trigger conditions are satisfied, provides a recommendation to enable location sharing on the device associated with the user; determines that the user has enabled location sharing on the device associated with the user; determines that the one or more trigger conditions are no longer satisfied; and in response to the determination that the one or more trigger conditions are no longer satisfied, disables location sharing on the device associated with the user.

In an implementation, a system for enabling location sharing for a user in response to determining that one or more trigger conditions are satisfied, and for disabling location sharing in response to determining that the one or more trigger conditions are no longer satisfied is provided. The system may include at least one computing device and a sharing engine. The sharing engine: determines a current location of a device associated with a user; determines one more other users that are within a threshold distance of the current location; based on the determined current location of the device associated with the user and the determined one or more other users, determines that one or more trigger conditions are satisfied; and in response to the determination that the one or more trigger conditions are satisfied, enables location sharing on the device associated with the user.

In an implementation, a method for enabling location sharing for a user in response to determining that one or more trigger conditions are satisfied, and for disabling location sharing in response to determining that the one or more trigger conditions are no longer satisfied is provided. The method includes: determining a plurality of environmental signals associated with a user by a computing device; based on the determined plurality of environmental signals, determining that one or more trigger conditions are satisfied by the computing device; in response to the determination that the one or more trigger conditions are satisfied, providing a recommendation for the user to enable location sharing by the computing device; determining that the user has enabled location sharing by the computing device; determining that the one or more trigger conditions are no longer satisfied by the computing device; and in response to the determination that the one or more trigger conditions are no longer satisfied, disabling location sharing by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
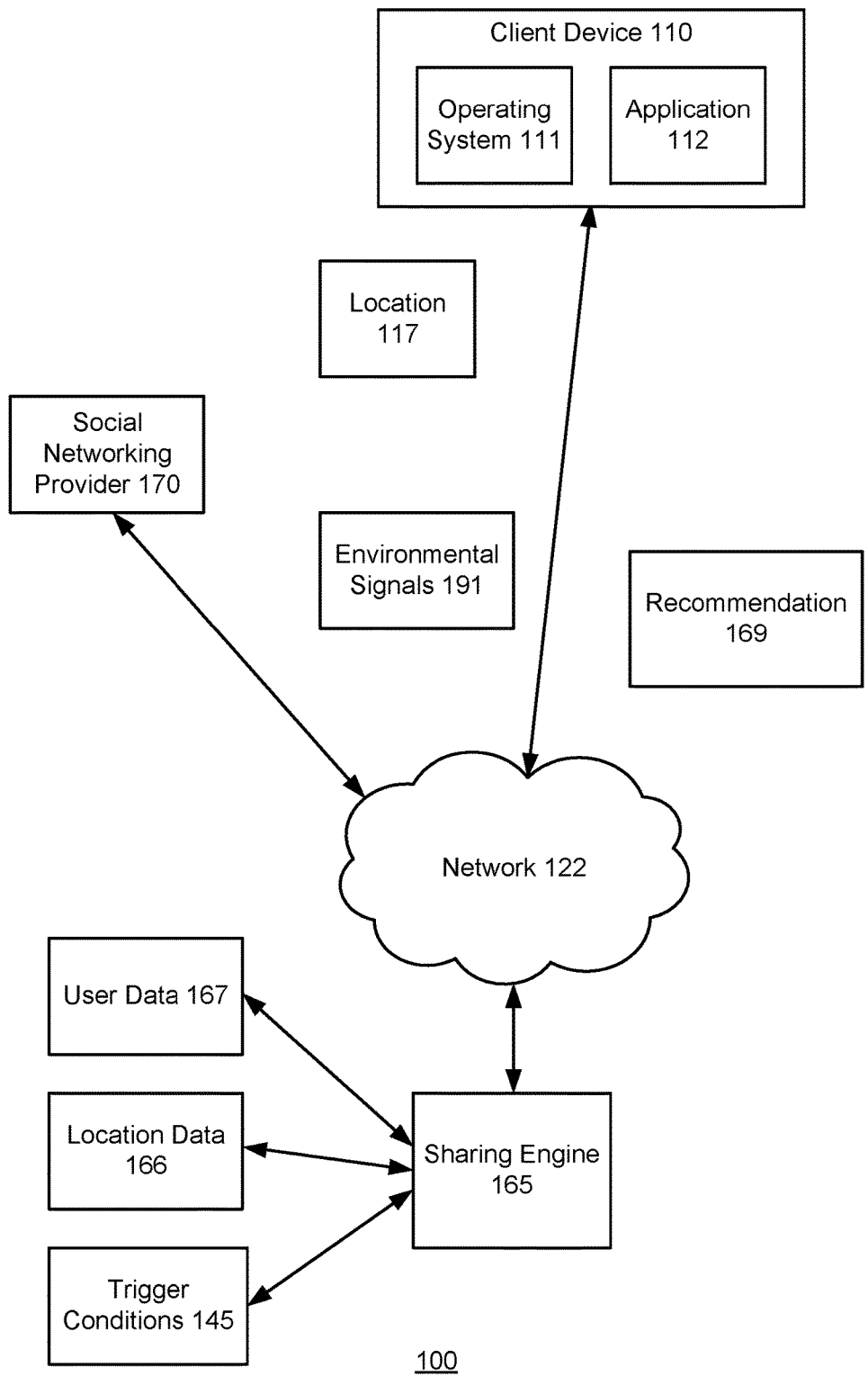
FIG. 1 is an illustration of an exemplary environment for recommending that a user enable location sharing based on environmental signals.

FIG. 1 is an illustration of an exemplary environment for recommending that a user enable location sharing based on environmental signals. The environment 100 may include a sharing engine 165, one or more social networking providers 170, and one or more client devices 110 in communication through a network 122. The network 122 may be a variety of network types including the public switched telephone network (PSTN), a cellular telephone network, and a packet switched network (e.g., the Internet). Although only one client device 110, one social networking provider 170, and one sharing engine 165 are shown in FIG. 1, there is no limit to the number of client devices 110, social networking providers 170, and sharing engines 165 that may be supported.

Figure 8:
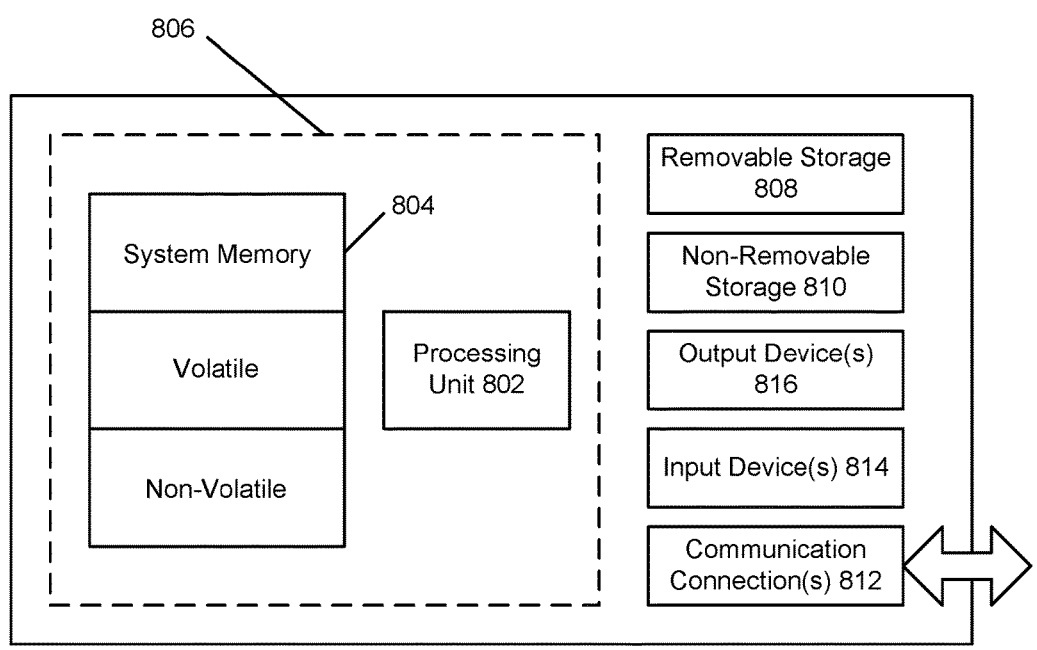
FIG. 8 shows an exemplary computing environment in which example embodiments and aspects may be implemented.

The client device 110 and the sharing engine 165 may be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 8 as the computing device 800.

Each client device 110 may execute an operating system 111 and one or more applications 112. The operating system 111 may control which applications 112 are executed by the client device 110, as well as control how the applications 112 interact with one or more sensors, services, or other resources of the client device 110. For example, the operating system 111 may control how each application 112 is able to access memory of the client device 110, network resources of the client device 110, and the camera of the client device 110.

Many client devices 110 include a location determination component that may be used to determine a location 117 of the client device 110. Examples of location determination components include a GPS receiver, or a WiFi based location determination component. Other methods or techniques for determining a location 117 of a client device 110 may be used.

The operating system 111 and/or the application 112 may use the location 117 of the client device 110 to provide what is referred to as location sharing. The operating system 111 may allow one or more applications 112 to access the location 117 of the client device 110 and to share the location 117 of the client device 110 with other users of the application 112. Depending on the implementation, the operating system 111 of the client device 110 may also share the location 117 of the client device 110 with the operating systems 111 of other client devices 110.

For example, the client device 110 may execute an application 112 such as a social networking application 112. The social networking application 112 may use the location sharing of the operating system 111 to determine the location 117 of the client device 110, and may share the location 117 with other users of the social networking application 112. In another example, an application 112 associated with a chain of fast food restaurants can use the location 117 of the user to determine when the user is near one of the restaurants. The application 112 can then alert the user or provide the user with a coupon to encourage the user to eat at the restaurant.

Typically, users are asked by the operating system 111 to enable location sharing on their client devices 110. The location sharing may be enabled (or disabled) by a user for all applications 112, or on an application 112 by application 112 basis. For example, when a user installs a new application 112, the operating system 111 may ask the user if they would like to enable location sharing on the application 112. If the user enables location sharing, then the application 112 may be permitted to access and share the current location 117 of the client device 110, else the application 112 may be blocked from accessing and sharing the location 117.

As described above, enabling location sharing can facilitate a wide variety of social interactions. For example, a user visiting a foreign city who has location sharing enabled may learn from an associated social networking application 112 that one of their contacts is also visiting the same city. The user can then reach out to the contact to meet up in the foreign city. Without location sharing, it is unlikely that the users would have crossed paths in the foreign city.

However, despite the benefits, many users initially disable location sharing on their client devices 110. This may be due to privacy concerns, or that most of a user's time is spent working or performing other activities that they do not want interrupted. While users can manually enable location sharing, most users do not make any changes to their location sharing preferences once they have been initially selected.

Accordingly, to facilitate the enabling and disabling of location sharing on the client device 110, the environment 100 may further include the sharing engine 165. The sharing engine 165 may determine when to send a recommendation 169 to the client device 110 to enable location sharing. The client device 110 may display a prompt or user interface element through which the user can choose whether to enable location sharing. If the user chooses to enable location sharing, the sharing engine 165 may at some later time automatically disable the location sharing for the user.

The sharing engine 165 may determine when to send a recommendation 169 to enable location sharing using one or more trigger conditions 145 associated with the user or the client device 110 associated with the user. The trigger conditions 145 may be a set of rules that when satisfied, indicate that enabling location sharing for the user may result in an improved user experience.

Depending on the implementation, the trigger conditions 145 may be based on the location 117 of the user and one or more environmental signals 191 collected by the client device 110 or received from one or more social networking providers 170. One example of an environmental signal 191 is identifiers of users that are within some threshold distance of the client device 110. The users may be users that the user associated with the client device 110 has a social networking relationship with in a social networking application 112. For example, the users may be "friends" of the user that are within one mile of the location 117 of the client device 110. The threshold distance may be set by a user or an administrator.

Other examples of environmental signals 191 may include the date, time, or temperature associated with the client device 110, whether or not the user is using an application 112 associated with the client device 110, a current speed of the client device 110, and how long the user has been at the current location 117. Other information may be included in the environmental signals 191.

Each trigger condition 145 may be based on the environmental signals 191. For example, one trigger condition 145 may be based on the number of friends of the user that are within the threshold distance of the user. Another trigger condition 145 may be based on whether the user has been at the location 117 for more than a threshold amount of time. If the user is near many of their friends or has been inactive for a long time, then it may be beneficial for the user to enable location sharing.

Other types of data used to create and satisfy trigger conditions 145 may include user data 167 and location data 166. The user data 167 may include data that has been collected about the user such as any appointments or upcoming meetings that the user may have, as well as the locations 117 that are frequented by the user. If the user data 167 indicates that the user is at a meeting, then it may not be a good time to enable location sharing. A location 117 that is frequented by a user because the user works or lives at the location 117 may similarly indicate that location sharing should not be enabled.

The location data 166 may include information about various locations 117. The location data 166 for a location 117 may indicate what type of business the location 117 is associated with if any, how popular the location 117 is, and what times users tend to visit the location 117. As may be appreciated, if a location 117 is associated with a business such as a nightclub or a concert venue, then it may be beneficial for the user to enable location sharing. Conversely, if the location 117 is associated with a business such as a dry cleaner, then the user may not benefit from location sharing. Locations 117 where it may be beneficial to enable location sharing may be identified as tagged locations in the location data 166.

After one, some, or all of the trigger conditions 145 have been satisfied, the sharing engine 165 may generate the recommendation 169, and may provide the recommendation 169 to the client device 110. The client device 110 may then display a prompt or other user interface element that asks the user if they would like to temporarily enable location sharing. If the user accepts the recommendation 169, then the location sharing may be enabled on the client device 110.

The sharing engine 165 may further determine when to disable the location sharing on the client device 110. In some implementations, the sharing engine 165 may determine, based on some or all of the environmental signals 191, location 117, user data 167, and location data 166, that the trigger conditions 145 are no longer met. For example, the user may have changed locations 117, or the friends of the user may no longer be within the threshold distance.

When the sharing engine 165 determines to disable the location sharing, the sharing engine 165 may disable the location sharing on the client device 110 automatically and without any action being taken by the user. Alternatively, the sharing engine 165 may generate a recommendation 169 that the user disable the location sharing.

As may be appreciated, the sharing engine 165 provides many advantages. For example, by using environmental signals 191 and other information about a user and the location 117 of the user, the sharing engine 165 can determine when a user is likely to benefit from or enjoy location sharing even where the user has previously disabled location sharing. Because the user may not have ever utilized location sharing in the past, the user may not recognize situations where location sharing would be enjoyable or beneficial.

Additionally, because the recommendation 169 to enable location sharing is displayed to the user and the user is able to enable location sharing using the displayed recommendation 169, the user is more likely to enable location sharing. Previously, even if a user wanted to enable location sharing, the options to enable location sharing were buried in the settings or preferences of their applications 112 and/or operating systems 111 making enabling the location sharing difficult and cumbersome. By displaying the recommendation 169 directly to the user, the user does not have to remember how to enable location sharing on their client device 110.

Moreover, by automatically disabling the location sharing for the user once the trigger conditions 145 are no longer satisfied, the user does not have to remember to disable location sharing. Previously, users may have been reluctant to temporarily enable location sharing on their devices when they are participating in a social event such as attending a concert because they feared forgetting to disable it when the concert was over. This would result in a user inadvertently sharing their location when they preferred their location to remain private. Because the user knows that the location sharing will be automatically disabled later, they are more likely to agree to enable the location sharing in response to a recommendation 169.

Figure 2:
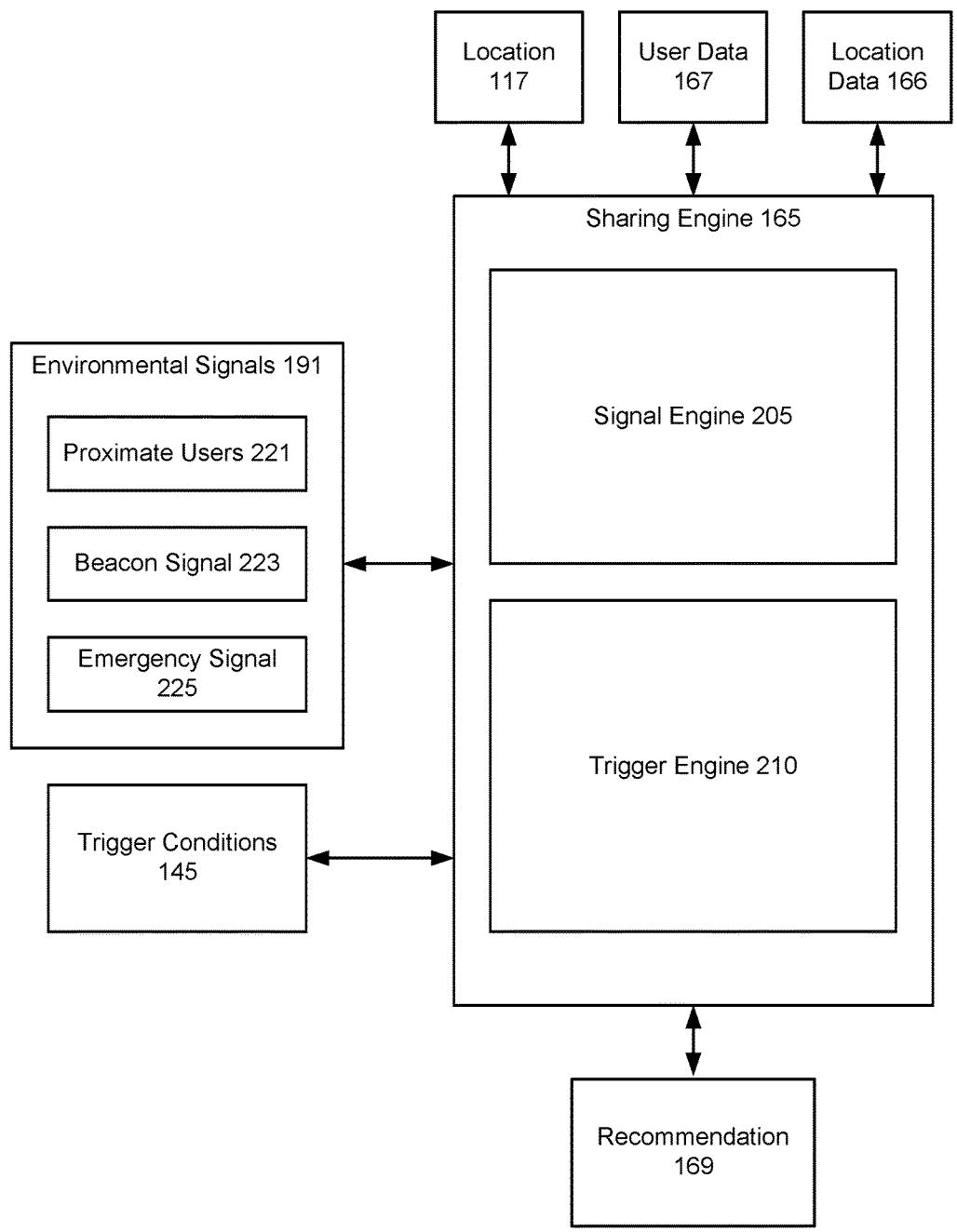
FIG. 2 is an illustration of an implementation of an exemplary sharing engine.

FIG. 2 is an illustration of an implementation of an exemplary sharing engine 165. The sharing engine 165 may include one or more components including a signal engine 205 and a trigger engine 210. More or fewer components may be included in the sharing engine 165. Some or all of the components of the sharing engine 165 may be implemented by one or more computing devices such as the computing device 800 described with respect to FIG. 8. Some or all of the functionality attributed to the sharing engine 165 may be performed by one or more of the social networking provider 170 or the client device 110. In addition, some or all of the functionality provided by any of the sharing engine 165, the signal engine 205, and the trigger engine 210 may be performed entirely or in part by a cloud based computing device.

The signal engine 205 may collect environmental signals 191 and other data that may be used by the sharing engine 165 to determine whether or not to enable (or disable) location sharing on the client device 110 associated with a user. As shown, the environmental signals 191 may include proximate users 221, beacon signals 223, and emergency signals 225.

The proximate users 221 may be indicators of the users that are within a threshold distance of the location 117. The users may be users that have a social networking relationship with the user associated with the client device 110 in one or more social networking applications 112. Depending on the implementation, the signal engine 205 may provide the location 117 associated with the user to the social networking provider 170, and the social networking provider 170 may provide indicators of the proximate users 221 (if any) to the signal engine 205.

In other implementations, the proximate users 221 may be determined by the signal engine 205 using one or more sensors associated with client device 110. For example, the signal engine 205 may use WiFi, Bluetooth, RFID, NFC, or some other wireless technology that may be used to detect the presence of client devices 110 associated with the proximate users 221.

The beacon signals 223 may be signals that are generated by a beacon or transmitter that is placed to encourage users to enable location sharing. Depending on the implementation, a beacon may be associated with an account in a social networking application 112. For example, a location such as a national park may place a beacon that transmits a signal to encourage visitors to the park to enable location sharing with the social networking account of the park while the visitors are visiting the park. If the visitors become lost or missing in the park, rangers associated with the park can use the location sharing to locate the lost or missing visitors.

The emergency signals 225 may be signals generated by a government agency in the event of an emergency to encourage users to enable location sharing during the emergency. Depending on the implementation, the emergency signals 225 may be generated by a transponder such as a WiFi router or cellular phone tower, and may be similarly associated with an account in a social networking application 112.

For example, when an emergency such as a fire or a shooting breaks out in an area, the police may send out an emergency signal 225 that encourages users in the area to enable location sharing on their client devices 110. The police, as well as friends and relatives, may then be able to locate the users during the emergency using the location sharing.

The signal engine 205 may further collect user data 167. The user data 167 may include data that is specific to or associated with each user. One example of user data 167 may be calendar data. The calendar data may be used to determine the locations 117 of the other users, what users are proximate users 221, and how long each user is likely to remain at a location 117. For example, a calendar entry associated with the user may indicate that the user will be having lunch in the park with John and Fred from 12 pm to 1:30 pm. The signal engine 205 may determine that the users John and Fred will be proximate users 221 to the user associated with the calendar from 12 pm to 1:30 pm at the location 117 of the park.

Another example of user data 167 is the location history of the user. The location history of the user may include locations 117 that the user has visited in the past along with dates and/or times that the user visited the locations 117. The location history of the user may be used to determine if a current location 117 of the user is a typical location 117 that is frequently visited by the user (e.g., their house, their work, etc.), or if the current location 117 is an unusual or special location 117 for the user (e.g., a new city or a foreign city, a neighborhood that the user rarely goes to, etc.)

The signal engine 205 may collect location data 166. The location data 166 may include information about a variety of locations 117. The location data 166 may indicate whether the location 117 is a residential location or a business location. The location data 166 may indicate whether the location 117 is associated with special events or occasions (e.g., concert venue, auditorium, vacations, etc.), or whether the location 117 is associated with more mundane or routine activities (e.g., supermarket, office building, dry cleaner, etc.). The location data 166 may be provided by the locations 117 themselves, or may be provided by a data aggregating service, for example. When a location 117 is associated with special events or occasions, it may be identified in the location data 166 as a tagged location 117.

Other examples of data that may be collected by the signal engine 205 include the date, the current temperature, and general event data. The event data may include information about any events such as concerts, movies, festivals, etc., that may be happening at or around the current location 117 of the user.

As may be appreciated, the various data collected by the signal engine 205 including the environmental signals 191, user data 167, and location data 166 may be personal and private. Accordingly, to protect the privacy of each user, any data collected by the signal engine 205 may be encrypted. Moreover, before any data is collected and used by the signal engine 205, each user may be asked to opt-in or otherwise consent to the collection and use of such data.

The trigger engine 210 may retrieve one or more trigger conditions 145 for a user of a client device 110. Each trigger condition 145 may be a rule, or set of rules, that takes as an input data collected by the signal engine 205, and based on the input data, indicates whether the client device 110 should enable location sharing. Depending on the implementation, each trigger condition 145 may be provided by the user or an administrator.

One example of a trigger condition 145 is that the user is located at a location 117 that is unusual for the user, or that is associated with special occasions or events (i.e., a tagged location 117). For example, if the user data 167 associated with the user indicates that the current location 117 of the user is not a location that the user typically visits, then the user may be open to enabling location sharing. In another example, the location data 166 may indicate that the user is at location 117 that is a tagged location 117 such as a concert venue or a theater, and may similarly be open to enabling location sharing.

Another example of a trigger condition 145 is that there are more than a threshold number of proximate users 221 detected by the sharing engine 165. The threshold may be set by a user or an administrator.

Other examples of trigger conditions 145 may include receiving beacon signals 223, receiving emergency signals 225, the current date being a weekend, and a calendar associated with the user indicating that they are on vacation or will be traveling to an unusual location 117. Other types of trigger conditions 145 may be supported.

The trigger engine 210 may generate a recommendation 169 in response to one or more of the trigger conditions 145 being met. Depending on the implementation, the recommendation 169 may be generated in response to certain combinations of trigger conditions 145 being met.

For example, a recommendation 169 may be generated in response to the trigger condition 145 of more than a threshold number of proximate users 221, and the trigger condition 145 of the current location 117 being a tagged location 117. As may be appreciated, when the user is at a location 117 such as their office, they may have multiple proximate users 221 (e.g., co-workers), but still may be unlikely to enable location sharing. Any combination of trigger conditions 145 may be used.

The trigger engine 210 may provide the recommendation 169 to the user at their client device 110. The client device 110 may generate a prompt or a user interface element asking the user to enable location sharing. The user may enable location sharing directly using the user interface element, and without having to use any menus or settings associated with the operating system 111 or application 112 associated with the client device 110.

In some implementations, the recommendation 169 may indicate reasons why the recommendation 169 was generated, and the indicated reasons may be displayed to the user in the user interface element. For example, if the recommendation 169 was generated because of trigger conditions 145 such as multiple proximate users 221, and the user having a location 117 that is a sporting venue, the user interface element may list the proximate users 221 and the sporting venue. In another example, if the recommendation 169 is generated in response to an emergency signal 225, the user interface element may indicate to the user the emergency condition that is associated with the emergency signal 225.

When the user enables location sharing using the user interface element, the user may enable location sharing with all of their friends or contacts in one or more social networking applications, or just a subset. For example, the user may choose to enable location sharing with subsets of their friends or contacts such as "college friends" and not enable location sharing with subsets such as "work friends."

Where the trigger condition 145 that resulted in the recommendation 169 is associated with environmental signals 191 such as one or more proximate users 221, beacon signals 223, or emergency signals 225, the user may select to only enable location sharing with the user or user accounts associated with the environmental signals 191. For example, if the trigger condition 145 was that the user is near a threshold number of proximate users 221, then the user may choose to enable location sharing only with respect to those proximate users 221. In another example, if the trigger condition 145 was a beacon signal 223 that is associated with a ski resort, then the user may choose to enable location sharing only with respect to the account in the social networking application associated with the ski resort.

In some implementation, rather than generate a recommendation 169, under certain circumstances, the trigger engine 210 may enable location sharing automatically on the client device 110, and without user action. For example, when the environmental signals 191 include emergency signals 225, the trigger engine 210 may automatically enable the location sharing. The particular circumstances or trigger conditions 145 under which the trigger engine 210 may automatically enable location sharing may be specified by the user or set by an administrator, for example.

The trigger engine 210 may also disable location sharing after it has been enabled on the client device 110. In some implementations, the trigger engine 210 may disable location sharing when some or all of the trigger conditions 145 that caused the recommendation 169 to be generated are no longer present. For example, the trigger engine 210 may disable the location sharing when the proximate users 221 have changed, the current location 117 associated with the user has changed, or the emergency signal 225 is no longer being received or transmitted.

Alternatively or additionally, the trigger engine 210 may disable location sharing after some amount of time has passed since it was enabled (e.g., after one hour, two hours, three hours, etc. have passed). The amount of time may be set by a user or an administrator. In another implementation, the trigger engine 210 may periodically remind the user the that location sharing has been enabled, and may ask the user to confirm that they want location sharing to remain enabled.

Figure 3:
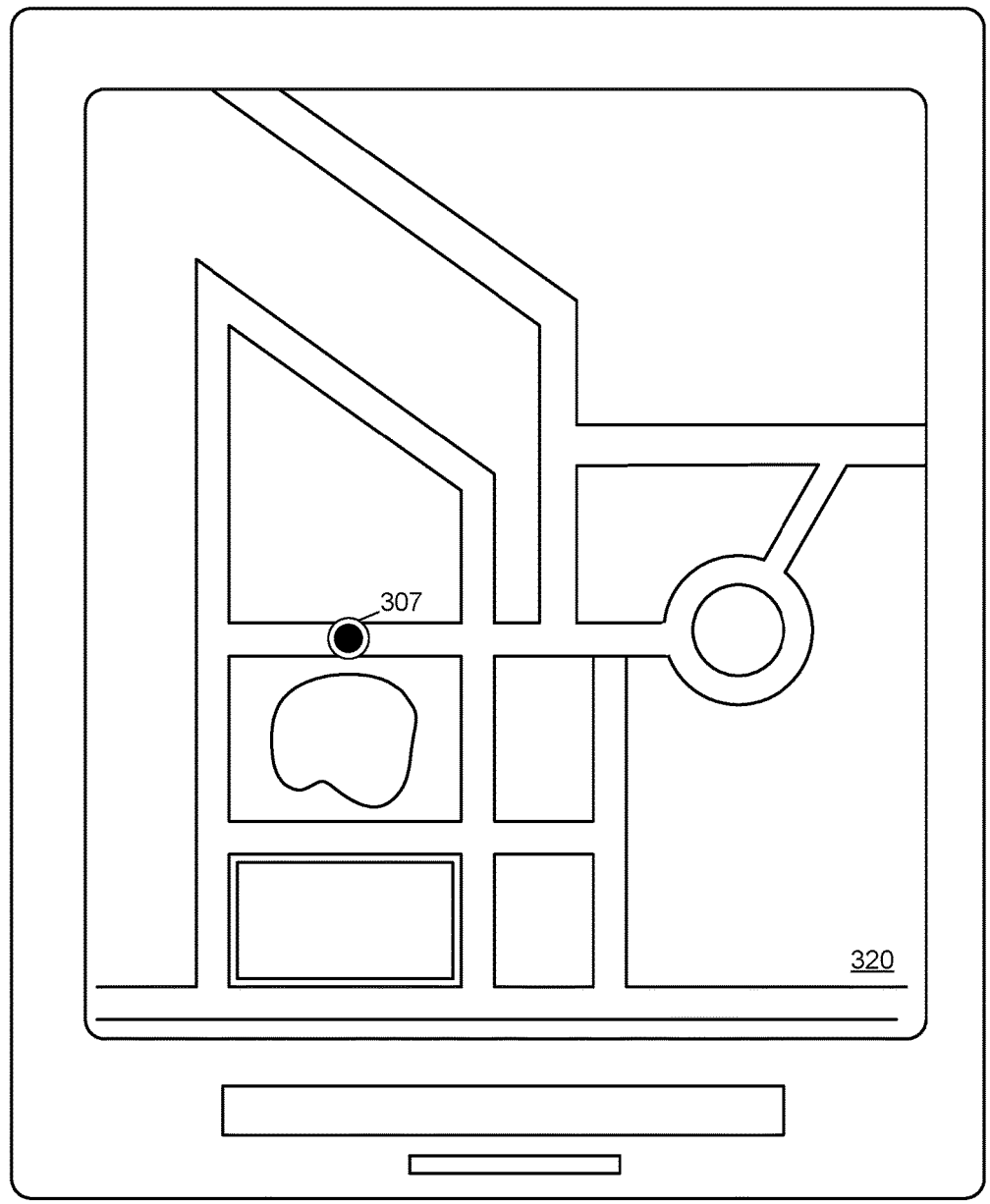
FIGS. 3-5 are illustrations of an example user interface for recommending that a user enable location sharing.

FIG. 3 is an illustration of an example user interface 300 for recommending that a user enable location sharing on a client device 110. The user interface 300 may be implemented by the client device 110 associated with the user. As shown, the user interface 300 is displayed on a tablet computing device. However, the user interface 300 may be displayed by other computing devices such as smartphones and vehicle navigation systems.

As shown in a window 320, a user is viewing a map using an application 112. The application 112 may be a map application 112, and may be similar to the map application 112 included in many smartphones. The current location 117 of the user on the map is shown in the window 320 by an icon 307. The location 117 of the user may be determined using a GPS or other location determination component associated with the client device 110.

To determine whether to enable location sharing, the client device 110 and/or the sharing engine 165 has collected data about the client device 110, including environmental signals 191 and other data, and has used the collected data to determine if any trigger conditions 145 associated with the client device 110 are satisfied.

Figure 4:
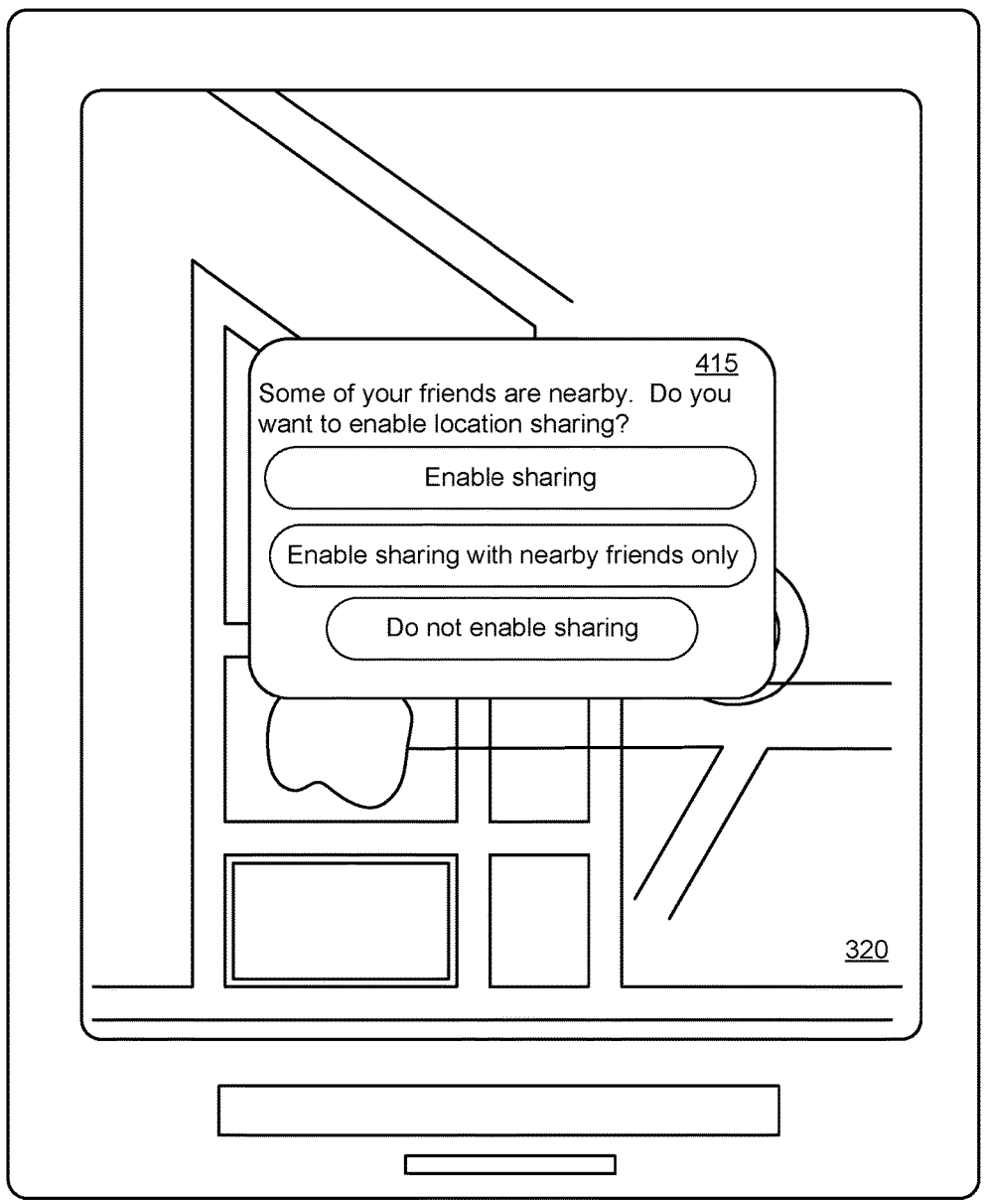

Continuing to FIG. 4, the sharing engine 165 has determined that there are some proximate users 221 that are near the location 117 of the user. In addition, the presence of the proximate users 221 has satisfied a trigger condition 145 associated with the client device 110. Based on the satisfied trigger condition 145, the sharing engine 165 has the provided a recommendation 169 that the client device 110 enable location sharing. In response to the recommendation 169, the client device 110 has generated, rendered, and displayed a user interface element 415 in the window 320.

In the example shown, the user interface element 415 includes the text "Some of your friends are nearby. Do you want to enable location sharing?" that explains to the user that one or more proximate users 221 were detected and encourages the user to enable location sharing. While the user interface element 415 shown does not specifically identify the proximate users 221, in other implementations the proximate users 221 may be identified.

The user interface element 415 comprises three buttons that the user can select from. The first button labeled "Enable sharing" enables location sharing on the client device 110 with all users that have a social networking relationship with the user associated with the client device 110. The second button labeled "Enable sharing with nearby friends only" enables location sharing with the proximate users 221 only. The third button labeled "Do not enable sharing" leaves location sharing disabled on the client device 110.

Figure 5:
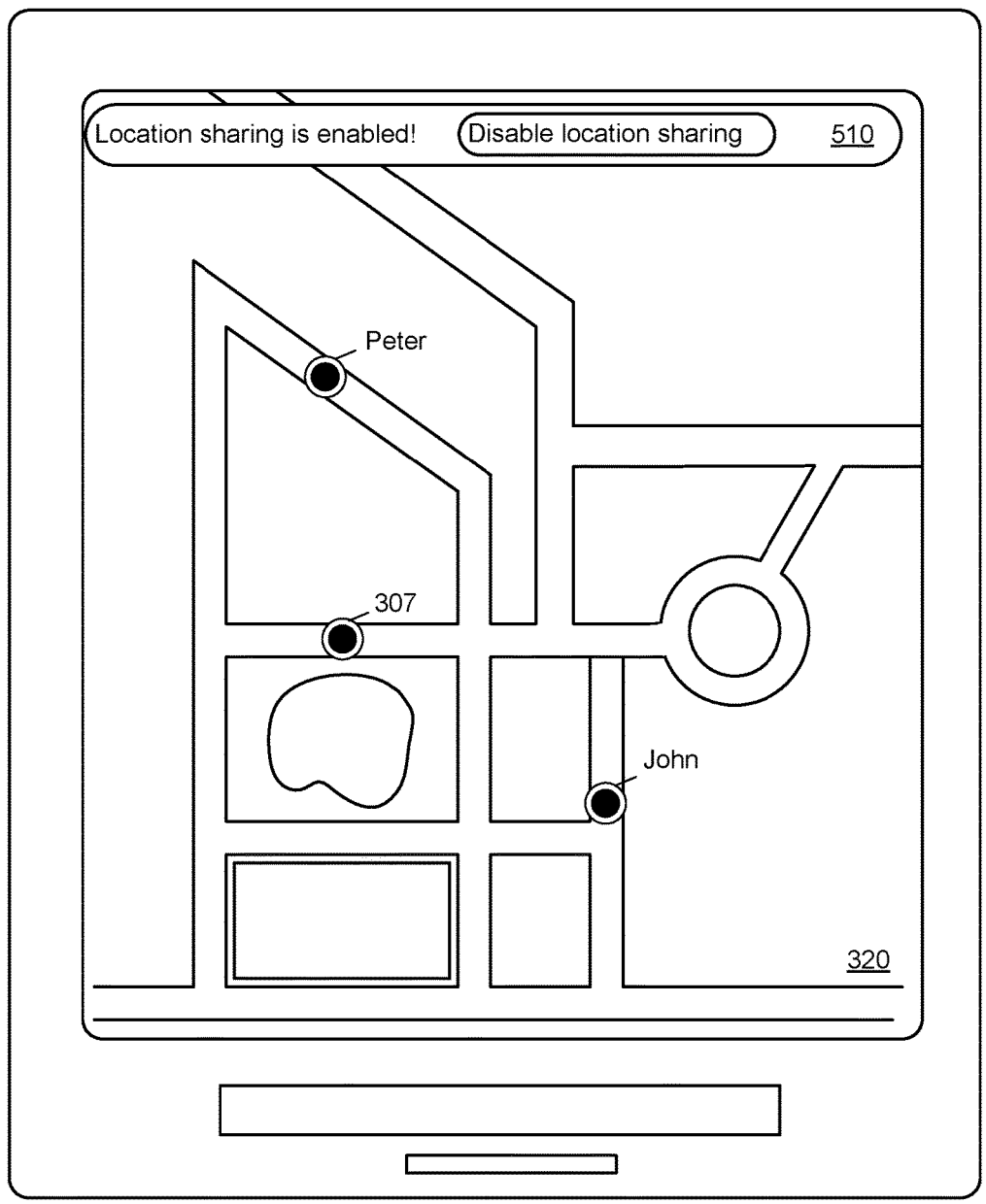

Continuing to FIG. 5, the user has selected the button labeled "Enable sharing with nearby friends only." Accordingly, the locations 117 associated with the proximate users 221 have been rendered and displayed on the map as the icons labeled "Peter" and "John." The location 117 of the user corresponding to the icon 307 has also been shared by the sharing engine 165 with the client devices 110 associated with the proximate users 221.

In addition, a user interface element 510 has been displayed in the window 320 that includes the text "Location sharing is enabled!" to remind the user that the location sharing has been enabled on the client device 110. The user interface element 510 also includes a button labeled "Disable location sharing" that the user can select to immediately disable location sharing on the client device 110.

Figure 6:
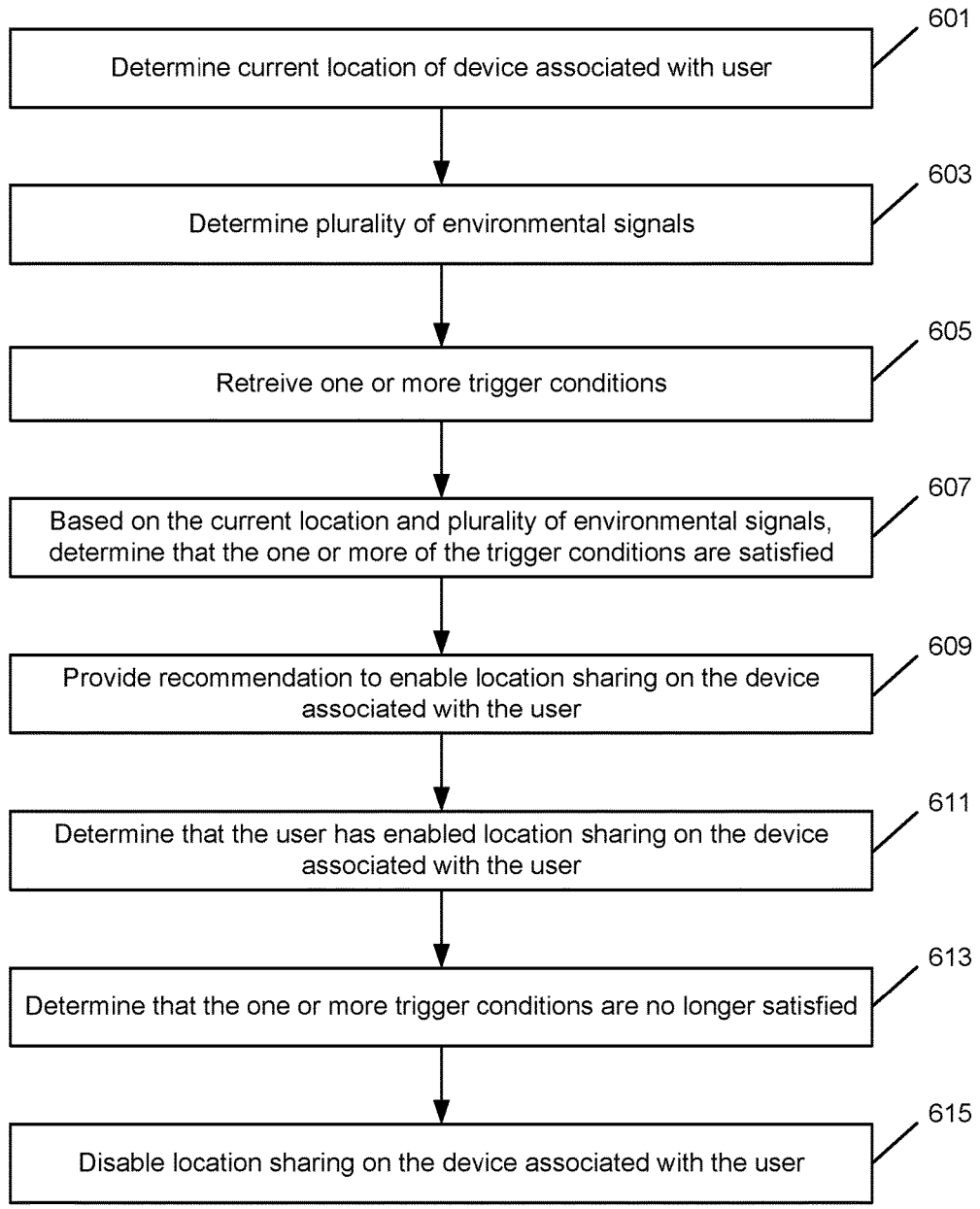
FIG. 6 is an operational flow of an implementation of a method for enabling and disabling location sharing on a client device based on environmental signals.

FIG. 6 is an operational flow of an implementation of a method 600 for enabling and disabling location sharing on a client device 110 based on environmental signals. The method 600 may be implemented by the sharing engine 165 and/or the client device 110, for example.

At 601, a current location of a device associated with a user is determined. The device may be the client device 110, and the current location 117 of the device may be determined using a location determination component of the device (e.g., a GPS).

At 603, a plurality of environmental signals is determined. The plurality of environmental signals 191 may be determined by the signal engine 205. The plurality of environmental signals 191 may include indications of one or more other users that are within a threshold distance of the current location 117 (i.e., the proximate users 221). The indications of the proximate users 221 may be received from one or more social networking providers 170 and may be users that have a social networking relationship with the user associated with the device. Other environmental signals 191 may include one or more beacon signals 223 and one or more emergency signals 225.

At 605, one or more trigger conditions are retrieved. The one or more trigger conditions 145 may be retrieved by the trigger engine 210. The one or more trigger conditions 145 may be specific to the user associated with the device, or may be associated with all of the users of the sharing engine 165. Each trigger condition 145 may be a rule that takes as an input some or all of the plurality of environmental signals 191 and/or the current location 117, and returns an indication of whether or not location sharing should be enabled. Other data may be used by the trigger conditions 145 such as user data 167 and location data 166, for example.

At 607, it is determined that the one or more trigger conditions have been satisfied. The determination may be made by the trigger engine 210 using the plurality of environmental signals 191 and/or the current location 117 of the device. A trigger condition 145 is satisfied when it returns an indication that location sharing should be enabled on the device associated with the user based on the environmental signals 191 and/or the current location 117.

At 609, a recommendation to enable location sharing is provided to the device associated with the user. The recommendation 169 may be for the device to ask the user if they would like to enable location sharing. Depending on the implementation, the recommendation 169 may include indications of one or more of the environmental signals 191 that satisfied the one or more trigger conditions 145 that led to the generation of the recommendation 169. For example, the recommendation 169 may indicate the proximate users 221.

At 611, it is determined that the user has enabled location sharing on the device associated with the user. That the user has enabled location sharing may be determined by the trigger engine 210 based on information received from the device associated with the user.

At 613, it is determined that the one or more trigger conditions are no longer satisfied. That the one or more trigger conditions 145 are no longer satisfied may be determined by the trigger engine 210. In some implementations, the trigger engine 210 may determine that some or all of the environmental signals 191 that originally satisfied the one or more trigger conditions 145 have changed. For example, some or all of the proximate users 221 may no longer be present.

At 615, location sharing on the device associated with the user is disabled. The location sharing may be disabled by the trigger engine 210 in response to the determination that the one or more trigger conditions 145 are no longer satisfied. In some implementations, the location sharing may be disabled automatically and without the user of the device having to take any action such as responding to a prompt or activating a user interface element.

Figure 7:
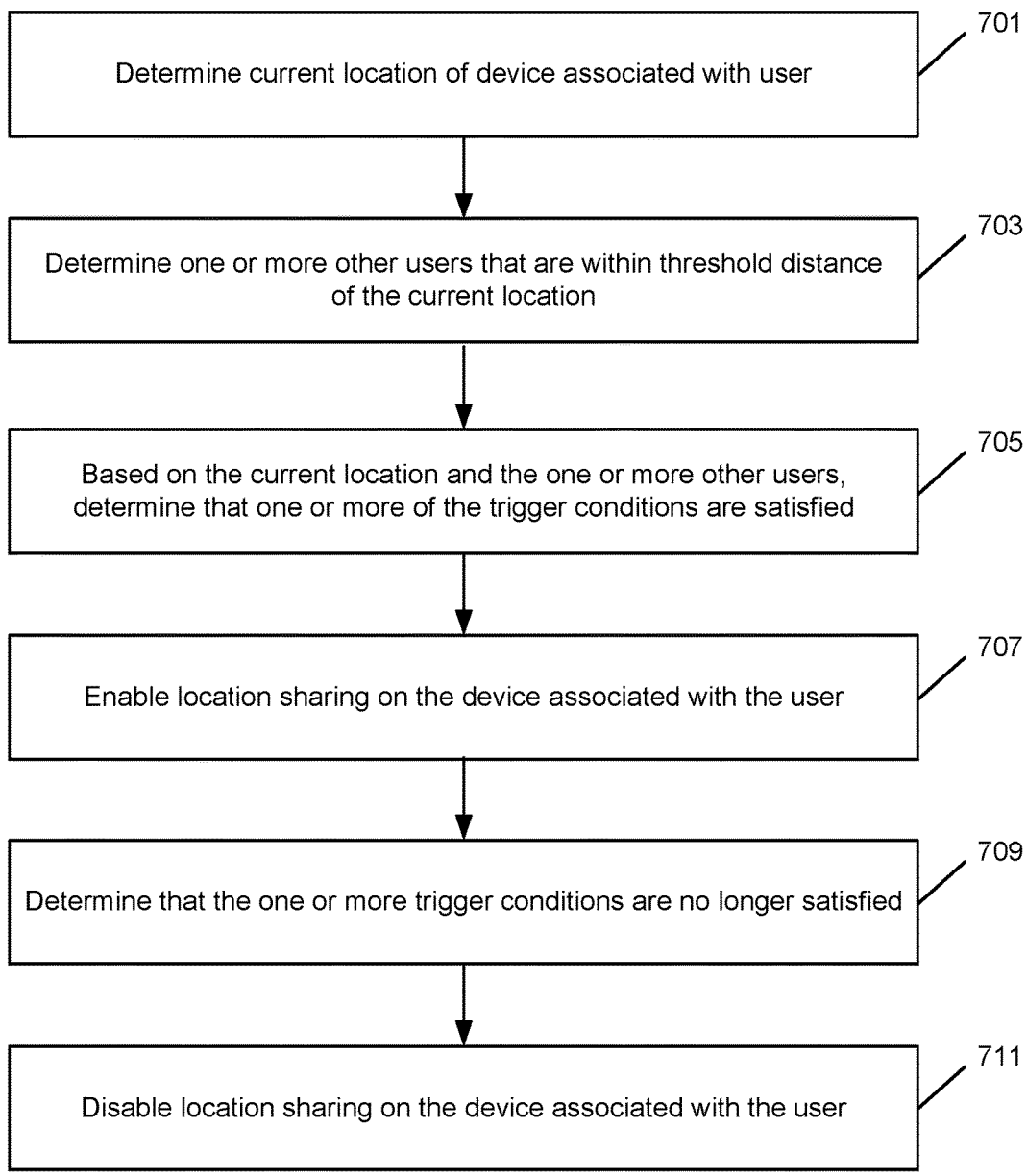
FIG. 7 is an operational flow of an implementation of a method for enabling and disabling location sharing on a client device based on proximate users.

FIG. 7 is an operational flow of an implementation of a method 700 for enabling and disabling location sharing on a client device 110 based on proximate users. The method 700 may be implemented by the sharing engine 165 and/or the client device 110, for example.

At 701, a current location of a device associated with a user is determined. The device may be the client device 110 and the current location 117 of the device may be determined using a location determination component of the device (e.g., a GPS).

At 703, one or more other users that are within a threshold distance of the current location are determined. The one or more other users that are within a threshold distance of the current location 117 may be determined by the signal engine 205 from information received from one or more social networking providers 170. The one or more other users may be the proximate users 221.

Depending on the implementation, the signal engine 205 may provide the current location 117 and an identifier of the user associated with the device to the social networking provider 170, and the social networking provider 170 may return indicators of other users that are within the threshold distance of the user associated with the device. The indicated other users may have a social networking relationship with the user associated with the device.

At 705, it is determined that one or more trigger conditions have been satisfied. The determination may be made by the trigger engine 210 using the determined one or more other users that are proximate to the user (i.e., proximate users 221) and/or the current location 117 of the device. A trigger condition 145 is satisfied when it returns an indication that location sharing should be enabled on the device associated with the user based on the environmental signals 191 and/or the current location 117.

At 707, location sharing is enabled on the device associated with the user. The location sharing may be enabled by the trigger engine 210 in response to the determination that one or more trigger conditions have been satisfied. Depending on the implementation, the location sharing may be enabled after the user agrees to enable location sharing, or without any action being taken by the user. After enabling the location sharing, some indication or notification that the location sharing has been enabled may be displayed to the user on their device.

At 709, it is determined that the one or more trigger conditions are no longer satisfied. That the one or more trigger conditions 145 are no longer satisfied may be determined by the trigger engine 210. In some implementations, the trigger engine 210 may determine that some or all of the users that were determined to be within the threshold distance of the device are no longer within the threshold distance.

At 711, location sharing on the device associated with the user is disabled. The location sharing may be disabled by the trigger engine 210 in response to the determination that the one or more trigger conditions 145 are no longer satisfied. In some implementations, the location sharing may be disabled automatically and without the user of the device having to take any action such as responding to a prompt or activating a user interface element.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system recommending that location sharing be enabled for a user in response to determining that one or more trigger conditions are satisfied, and for disabling location sharing in response to determining that the one or more trigger conditions are no longer satisfied is provided. The system includes at least one computing device and a sharing engine. The sharing engine: determines a current location of a device associated with a user; determines a plurality of environmental signals; retrieves one or more trigger conditions; based on the determined current location of the device associated with the user and the determined plurality of environmental signals, determines that the one or more trigger conditions are satisfied; in response to the determination that the one or more trigger conditions are satisfied, provides a recommendation to enable location sharing on the device associated with the user; determines that the user has enabled location sharing on the device associated with the user; determines that the one or more trigger conditions are no longer satisfied; and in response to the determination that the one or more trigger conditions are no longer satisfied, disables location sharing on the device associated with the user.

Implementations may include some or all of the following features. The plurality of environmental signals may include indications of one or more other users that are within a threshold distance of the current location. The one or more other users may have a social networking relationship with the user. The recommendation to enable location sharing may include a recommendation to enable location sharing with the one or more other users. The plurality of environmental signals may include a signal from a beacon. The recommendation to enable location sharing may include a recommendation to enable location sharing with an account associated with the beacon. The plurality of environmental signals may include an emergency signal. The recommendation to enable location sharing may include a recommendation to enable location sharing with an account associated with the emergency signal. The sharing engine that determines that the one or more trigger conditions have been satisfied may include the sharing engine that determines that the current location of the device matches one or more flagged locations. The sharing engine that disables location sharing on the device associated with the user may include the sharing engine that automatically disables location sharing on the device and without action by the user.

In an implementation, a system for enabling location sharing for a user in response to determining that one or more trigger conditions are satisfied, and for disabling location sharing in response to determining that the one or more trigger conditions are no longer satisfied is provided. The system may include at least one computing device and a sharing engine. The sharing engine: determines a current location of a device associated with a user; determines one more other users that are within a threshold distance of the current location; based on the determined current location of the device associated with the user and the determined one or more other users, determines that one or more trigger conditions are satisfied; and in response to the determination that the one or more trigger conditions are satisfied, enables location sharing on the device associated with the user.

Implementations may include some or all of the following features. The sharing engine further determines that the one or more trigger conditions are no longer satisfied; and in response to the determination that the one or more trigger conditions are no longer satisfied, disables location sharing on the device associated with the user. The sharing engine that determines that the one or more trigger conditions are no longer satisfied may include the sharing engine that determines that the current location of the device associated with the user has changed, or the sharing engine that determines an amount of time has expired. The one or more other users may have a social networking relationship with the user associated with the device. The sharing engine further enables location sharing with the determined one or more other users.

In an implementation, a method for enabling location sharing for a user in response to determining that one or more trigger conditions are satisfied, and for disabling location sharing in response to determining that the one or more trigger conditions are no longer satisfied is provided. The method includes: determining a plurality of environmental signals associated with a user by a computing device; based on the determined plurality of environmental signals, determining that one or more trigger conditions are satisfied by the computing device; in response to the determination that the one or more trigger conditions are satisfied, providing a recommendation for the user to enable location sharing by the computing device; determining that the user has enabled location sharing by the computing device; determining that the one or more trigger conditions are no longer satisfied by the computing device; and in response to the determination that the one or more trigger conditions are no longer satisfied, disabling location sharing by the computing device.

Implementations may include some or all of the following features. The plurality of environmental signals may include indications of one or more other users that are within a threshold distance of the current location. The plurality of environmental signals may include a signal from a beacon. The plurality of environmental signals may include an emergency signal. Disabling location sharing may include disabling location sharing automatically and without action by the user.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   a computing device; and
   a sharing engine that:
      determines a current location of a device associated with a user;
      determines a plurality of environmental signals;
      retrieves one or more trigger conditions configured without input from the user;
      based on the determined current location of the device associated with the user and the determined plurality of environmental signals, determines that the one or more trigger conditions are satisfied automatically and without input from the user;
      determines that location sharing is disabled on the device;
      in response to the determination that the one or more trigger conditions are satisfied and that location sharing is disabled on the device presents a prompt on a display of the device, the prompt soliciting input from the user to temporarily enable location sharing to share a location of the device associated with the user;
      determines that the user has enabled location sharing on the device associated with the user;
      determines that the one or more trigger conditions are no longer satisfied; and
      in response to the determination that the one or more trigger conditions are no longer satisfied, disables location sharing on the device associated with the user.

2. The system of claim 1, wherein the plurality of environmental signals comprise indications of one or more other users that are within a threshold distance of the current location.

3. The system of claim 2, wherein the one or more other users have a social networking relationship with the user.

4. The system of claim 2, wherein the recommendation to enable location sharing comprises a recommendation to enable location sharing with the one or more other users.

5. The system of claim 1, wherein the plurality of environmental signals comprises a signal from a beacon.

6. The system of claim 5, wherein the recommendation to enable location sharing comprises a recommendation to enable location sharing with an account associated with the beacon.

7. The system of claim 1, wherein the plurality of environmental signals comprises an emergency signal.

8. The system of claim 7, wherein the recommendation to enable location sharing comprises a recommendation to enable location sharing with an account associated with the emergency signal.

9. The system of claim 1, wherein the sharing engine determines that the one or more trigger conditions have been satisfied by determining that the current location of the device matches one or more flagged locations.

10. The system of claim 1, wherein the sharing engine disables location sharing on the device associated with the user by automatically disabling location sharing on the device without action by the user.

11. A system comprising:
    a sharing engine stored in memory that:
       determines a current location of a computing device associated with a user;
       determines one more other devices that are within a threshold distance of the current location;
       based on the determined current location of the computing device associated with the user and the determined one or more other users, determines that one or more trigger conditions are satisfied automatically and without input from the user, the trigger conditions being configured for the computing device without input from the user;
       determines that location sharing is disabled on the computing device; and in response to the determination that the one or more trigger conditions are satisfied and that location sharing is disabled on the device, presenting a prompt on a display of the computing device, the prompt soliciting user input to temporarily enable location sharing to share a location of the computing device associated with the user.

12. The system of claim 11, wherein the sharing engine further:
determines that the one or more trigger conditions are no longer satisfied; and
in response to the determination that the one or more trigger conditions are no longer satisfied, disables location sharing on the device associated with the user.

13. The system of claim 12, wherein the sharing engine determines that the one or more trigger conditions are no longer satisfied by determining that the current location of the device associated with the user has changed or by determining that an amount of time has expired.

14. The system of claim 11, wherein the one or more other users have a social networking relationship with the user associated with the device.

15. The system of claim 11, wherein the sharing engine further enables location sharing with the determined one or more other users.

16. A method comprising:
determining a plurality of environmental signals associated with a user by a computing device;
based on the determined plurality of environmental signals, determining that one or more trigger conditions are satisfied by the computing device, the trigger conditions being configured for the computing device without input from the user;
determining that location sharing is disabled on the computing device;
in response to the determination that the one or more trigger conditions are satisfied and that location sharing is disabled on the computing device presenting a prompt on a display of the computing device, the prompt soliciting input from the user to temporarily enable location sharing to share a location of the computing device;
determining that the user has enabled location sharing by the computing device;
determining that the one or more trigger conditions are no longer satisfied by the computing device; and
in response to the determination that the one or more trigger conditions are no longer satisfied, disabling location sharing by the computing device.

17. The method of claim 16, wherein the plurality of environmental signals comprises indications of one or more other users that are within a threshold distance of the current location.

18. The method of claim 16, wherein the plurality of environmental signals comprises a signal from a beacon.

19. The method of claim 16, wherein the plurality of environmental signals comprises an emergency signal.

20. The method of claim 16, wherein disabling location sharing comprises disabling location sharing automatically and without action by the user.

* * * * *